United States Patent [19]

Takagi et al.

[11] Patent Number: 4,556,153
[45] Date of Patent: Dec. 3, 1985

[54] MAGNETIC RECORDING TAPE CARTRIDGE

[75] Inventors: Hiroyoshi Takagi, Kameoka; Toshiyuki Amaike, Osaka; Hikaru Mizutani, Mino, all of Japan

[73] Assignee: Hitachi Maxell Ltd., Osaka, Japan

[21] Appl. No.: 623,456

[22] Filed: Jun. 22, 1984

[30] Foreign Application Priority Data

Jun. 22, 1983 [JP] Japan .............................. 58-112544

[51] Int. Cl.⁴ ............................................. G11B 23/10
[52] U.S. Cl. .................................. 220/334; 206/387; 242/198; 242/199
[58] Field of Search ................ 220/334, 335; 206/387; 242/198, 199; 360/132

[56] References Cited

U.S. PATENT DOCUMENTS

| 3,900,170 | 8/1975 | Serizawa | 242/198 |
| 3,900,172 | 8/1975 | Kamaya | 242/198 |
| 3,980,255 | 9/1976 | Serizawa | 242/199 X |
| 4,382,522 | 5/1983 | Shimazu et al. | 206/387 X |
| 4,418,373 | 11/1983 | Fujimori et al. | 242/199 X |
| 4,485,989 | 12/1984 | Ogiro et al. | 242/198 |
| 4,501,396 | 2/1985 | Tomsyck et al. | 242/199 |

Primary Examiner—Steven M. Pollard
Attorney, Agent, or Firm—Birch, Stewart, Kolasch & Birch

[57] ABSTRACT

In a recording tape cartridge having a movable front lid and a movable dust cover for protecting a recording tape, there is provided a locking member for locking the dust cover in a closed position.

18 Claims, 34 Drawing Figures

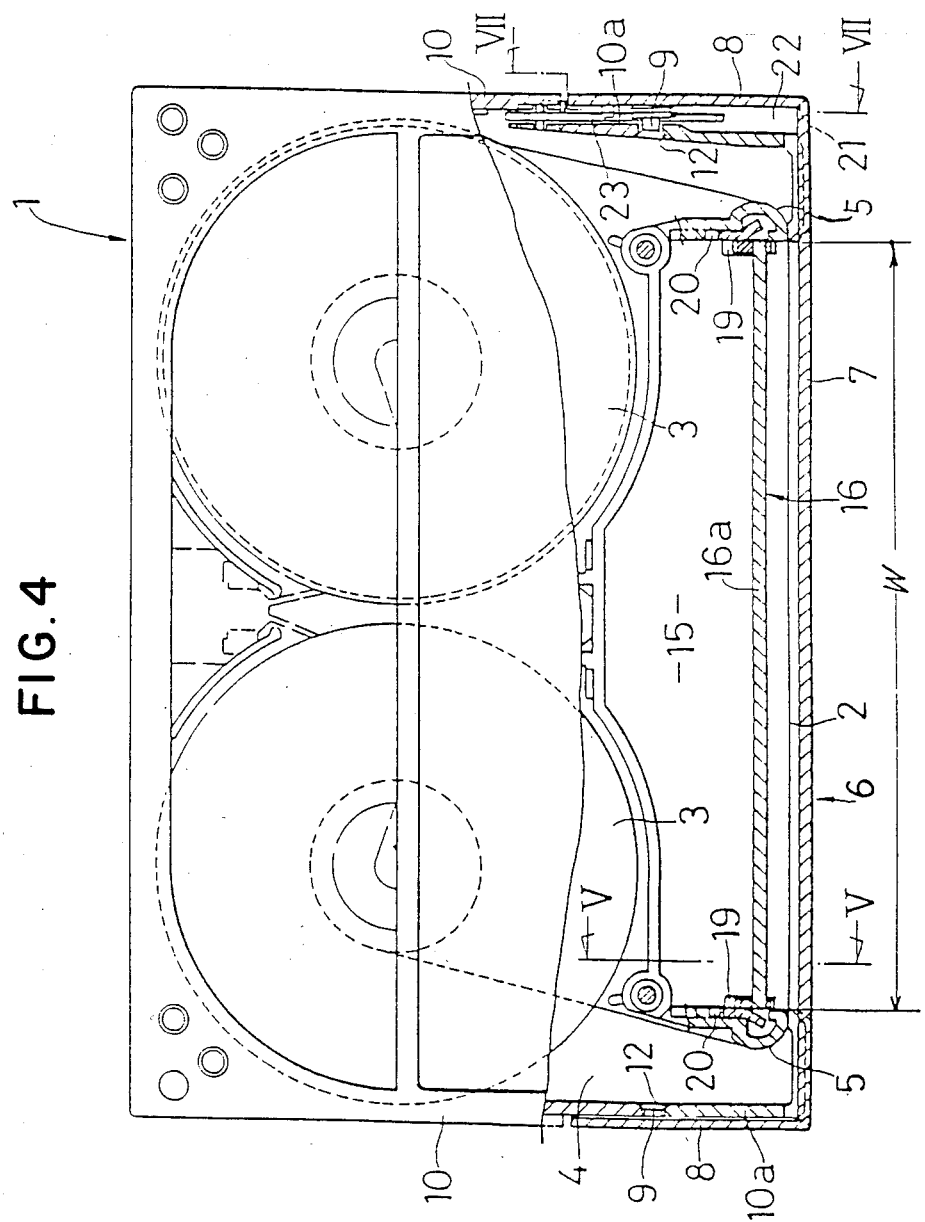

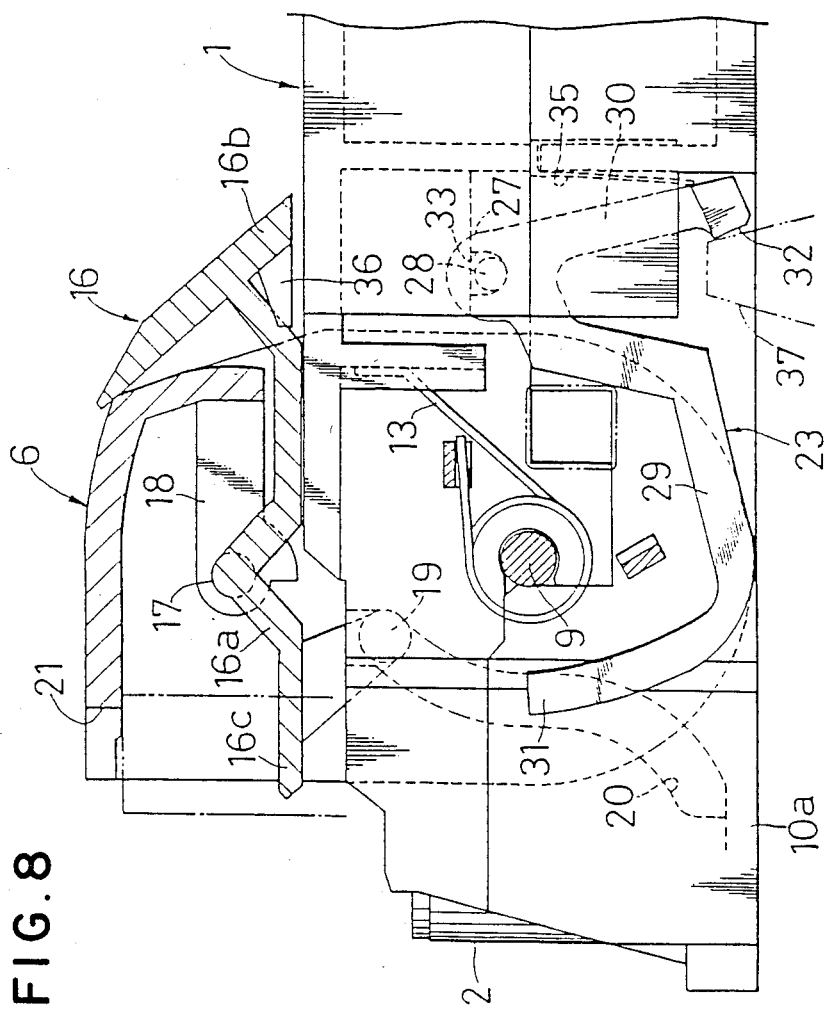

MAGNETIC RECORDING TAPE CARTRIDGE

FIELD OF THE INVENTION

The present invention relates to a recording tape cartridge, and more particularly to a recording tape cartridge comprising a lid member for protecting a front surface of a recording tape and dust cover co-operating with the lid member for protecting the rear surface of the recording tape.

BACKGROUND OF THE INVENTION

In a video tape cartridge as shown in FIGS. 3 and 4, a case body 1 is provided with a front lid 6 which is movable between a closed position for covering the front face of a video tape 2 existing on the front portion of the case body 1 when the video tape cartridge is not used and an opened position upon mounting on the video tape recorder, where the video tape can be drawn out of the case body 1 by tape loading members provided on the video tape recorder entering in the case body from below passing through a pocket 15 defined in the bottom of the case body 1.

In the video tape cartridge of the kind described above, dust or the like may enter inside the case body 1 through the pocket 15, it is required to prevent dust or the like from fitting on the video tape 2. For this purpose, a dust cover 16 is provided on the back of the front lid 6 so as to enclose the video tape 2 therebetween when the video tape is not used.

Said dust cover 16 is rotatably connected to the front lid 6 through a connecting shaft 17 as shown in FIG. 5 so as to co-operate with the rotational movement of the front lid 6. More specifically, when the front lid 6 is in the closed position, the dust cover 16 is situated in the closed position as shown in the real lines in FIG. 5. Upon movement of the front lid 6 towards the opened position, said dust cover 16 is rotated around the shaft 17, with the movement of the guide shaft 19 slidingly shifted along a guide slot 20 formed in the outer face of the case body 1, whereby finally the front lid 6 and the dust cover 16 can be moved upwardly to the opened position as shown in the dotted lines in FIG. 5.

In a conventional video tape cartridge of the above type there is not provided a locking mechanism for locking the dust cover 16 in the closed position when in no use. Namely, conventionally, there is only provided a mechanism for locking the front lid 6 in the closed position when in no use by a locking member 70 and lock means including a spring member 71 exerting the front lid 6 toward the closed position by a spring member 13. Due to the absence of the locking mechanism of the dust cover, there is a possibility of undesired movement of the dust cover due to vibration applied to the case body or an undesired contact of the man's finger, resulting in making a gap g between the bottom end portions of the front lid 6 and the dust cover 16 where originally they should contact one another when the video tape cartridge is not in use, thereby allowing entering of dust or the like in the space between the front lid 6 and the dust cover 16 or if the recording tape is slacked, the recording tape 2 is protruded through the gap g, causing the recording tape to be injured.

SUMMARY OF THE INVENTION

The essential object of the present invention is to provide a recording tape cartridge which enables to prevent undesire opening between the dust cover and the front lid so as to assure a protection of the recording tape when the tape cartridge is not used.

Another object of the present invention is to provide a recording tape cartridge in which lock means for the front lid can be omitted for enabling the size of the cartridge to be small and the construction to be simple.

Additional objects and advantages of the present invention will be apparent to those skilled in the art from the following description.

According to the present invention, there is provided a magnetic recording tape cartridge comprising a case body, a recording tape accommodated in the case body, front lid means movably mounted on the case body, being operable to be opened and closed for covering the front surface of the recording tape drawn out of the case body upon closure of the front lid means, dust cover means movably mounted on the case body, being operable to be opened and closed for covering the rear surface of the recording tape drawn out of the case body upon closure of the dust cover means and lock means for keeping the dust cover means in the closed state.

BRIEF EXPLANATION OF THE DRAWINGS

FIG. 4 is a partial plan view of FIG. 3, FIG. 8 is a partial cross sectional view showing an essential portion of the front lid and dust cover in an opened position.

DETAILED DESCRIPTION OF THE PREFERRED EMBODIMENTS

Basic Construction of the Recording Tape Cartridge

Figure 3:
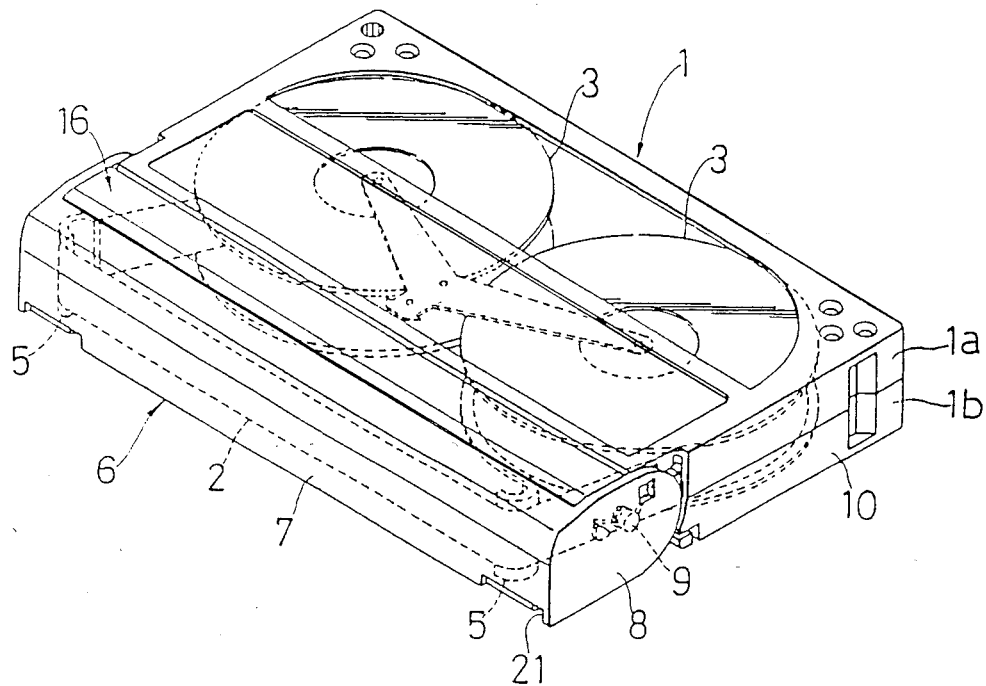
FIG. 3 is a perspective view showing an outer appearance of a recording tape cartridge to which the present invention is applied.

FIGS. 3 and 4 show basic construction of the recording tape cartridge to which the present invention can be applied, in which the case body 1 is formed by a top section 1a and a bottom section 1b, each being made of plastic resin material by molding method. The top section 1a and the bottom section 1b are assembled together in a butting manner and fixedly connected by screws so as to provide a tape chamber in which a pair of tape reels 3 is accommodated with the recording tape 2 wound. The tape reels 3 are rotatably mounted on driving shaft insertion holes defined on the bottom wall 4 of the bottom section 1b. The recording tape 2 released from one of the tape reels 3 can be drawn out of the case body 1, passing the tape path guide pins 5 situated on the left portion and the right portion of the case body 1, then taken up by other tape reel.

Front Lid Arrangement

The front lid 2 is rotatably mounted on the case body 1 for covering the front surface of the recording tape 2 drawn out in the front part of the case body 1. The front lid 6 is made of plastic resin formed by molding and comprises a generally planner lid plate 7 for covering laterally over the front part of the case body 1, a pair of connecting arms 8 projected backward from the both end portion of the lid plate 7 and supporting shafts 9 projected inwardly from the both of the connecting arms 8 in an opposing manner. The connecting arms 8 are fitted to the case body with the inner surfaces of the connecting arms 8 opposed the outer walls 10a formed inwardly stepped on the left and right side walls 10 of the top section 1a, having the supporting shafts 9 rotatably engaged in the supporting holes 12 defined in the outer walls 10a so that the front lid 6 is rotatable between the closed position and the opened position. The front lid member is normally exerted towards the closed position by a spring member 13 mounted on a projection 9. When the recording tape cartridge is not used the front lid 6 is in the closed position so as to cover the front surface of the recording tape 2 for protection thereof and when the recording tape cartridge is mounted on the video tape recorder, the front lid 6 is upwardly moved to open the front part of the case body so that the recording tape can be drawn frontward by a tape loading member of the video tape recorder entering in the pocket 17 of the case body 1.

Dust Cover Arrangement

Figure 5:
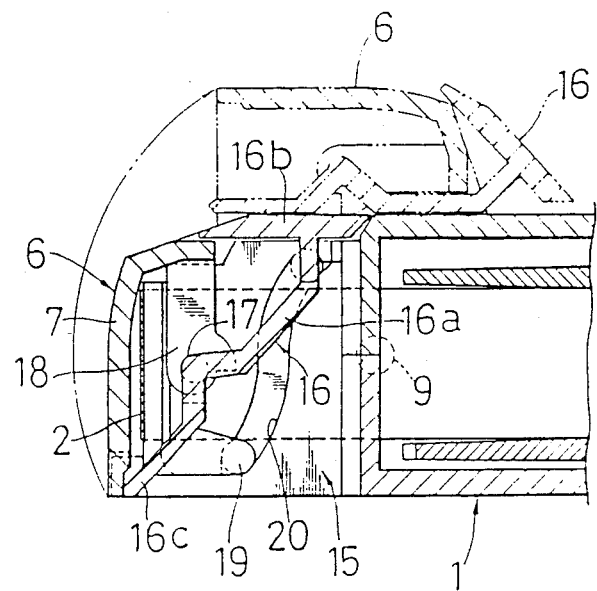
FIG. 5 is a cross sectional view taken along the lines V—V in FIG. 4.
Figure 6:
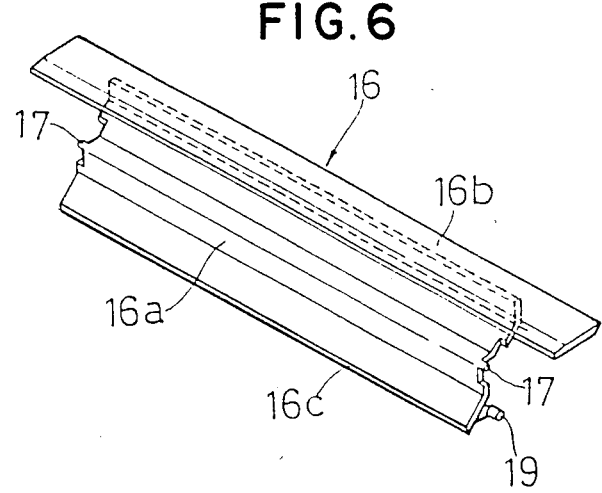
FIG. 6 is a perspective view of the dust cover.

In FIGS. 5 and 6 the dust cover 16 is connected to the rear portion of the front lid 6. The dust cover 16 is made of plastic resin material by molding and comprises a plate like cover body 16a situated across the front part of the pocket 15, opposing in parallel to the rear surface of the lid plate 7 of the front lid 6 in the closed position with the recording tape 2 therebetween, a top plate 16b projecting from the top end portion of the cover body 16a for closing the space between the left and right side walls of the case body 1 including the upper opening of the front portion of the pocket 15 and a bottom plate 16c having the front edge thereof adapted to contact bottom edge of the lid plate 7 in the portion corresponding to the pocket 15. A pair of connecting shafts 17 projected from the both left and right end of the cover plate 16b are supported by hanging arms 18 downwardly projected from the lid plate 7. Also, a pair of guide pins 19 are formed on the connecting shafts 17, being slidably fitted in the guide slots 20 defined on the left and right side walls of the pocket 15. The dust cover 16 acts to close the rear portion including space below the recording tape 2 and the upper portion of the pocket 15 as shown in the real lines in FIG. 5 so as to prevent entering of dust from the pocket to the recording tape 2 when the video tape cartridge is not used. The dust cover can be rotated upwardly about the connecting shafts 17 to the opened position along with the opening movement of the front lid 6, causing the guide pins 19 to slide along the guide slots 29, thereby the dust cover 16 is opened without interfering with the recording tape 2 as shown in dotted lines in FIG. 5.

The Arrangement for Exerting the Front Lid Towards the Closed Position

A space 22 is defined between the outer surface 10a of the right side wall 10 of the case body 1 and the right connecting arm 8 of the front lid 6. A cut portion 21 is defined on the right end portion of the lid plate 7 of the front lid 6 corresponding to the front part of the space 22. The spring member 13 is accommodated in the space 22 as shown in FIG. 7, wherein the intermediate coiled portion 13a of the spring member 13 is fitted on the projection 9 with one end 13b thereof engaged in a longitudinal slot 25 formed on the outer surface 10a of the right side wall 10 and the other end 13c supported in a supporting member 26 formed on the inner surface of the right connecting arm 8 of the front lid 6.

Dust Cover Locking Device

Example 1

Figure 9:
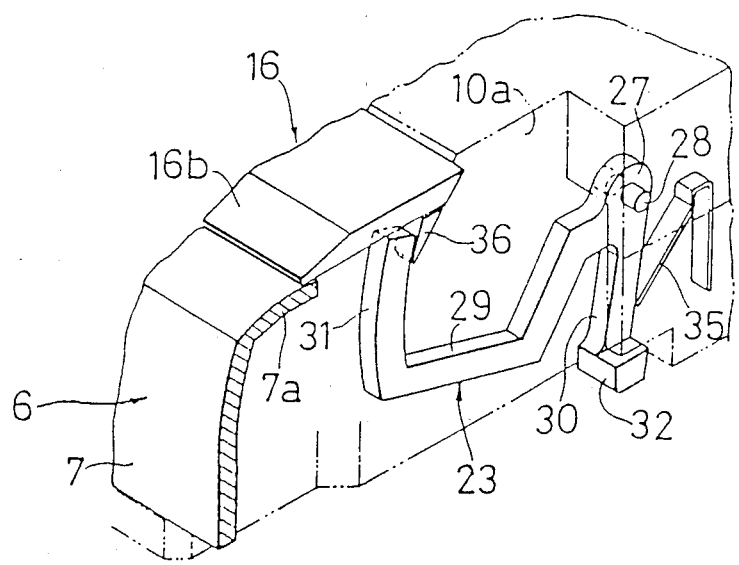
FIG. 9 is a partial perspective view of an essential portion of the recording tape cartridge.
Figure 7:
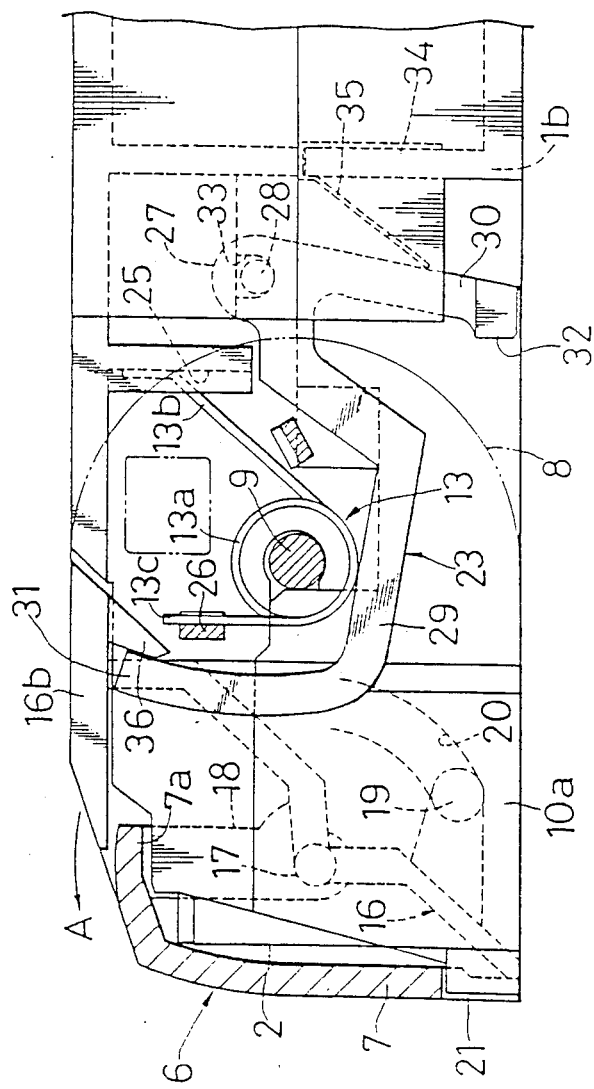
FIG. 7 is a cross sectional view taken along the lines VII—VII in FIG. 4.

Referring to FIGS. 7 through 9, a lock member 23 is disposed in the space 22. Said lock member 23 is made of a generally S character shaped plate of plastic resin material with a pair of supporting pins 28 projected towards both sides from a base portion 27 from which arms 29 and 30 are downwardly extended. The lock member 23 is rotatably suspended in said space 22 by hanging the supporting pins 28 on the bearing recesses 33 formed on the right wall 10 of the case body 1 so that the front arm portion 29 extending towards the front direction being passed below the supporting shaft 9 and the spring member 13 with the free end portion 31 directed upwardly for providing an engaging member. The rear arm portion 30 is adapted to extend downwardly with the lower free end formed a pressing member 32. The lock member 23 is exerted frontward by a locking spring 35 engaged with a spring receiving wall 34 fored on the bottom section 1b.

An engaging projection 36 is formed downwardly on the inner surface of the right side portion of the top plate 16b of the dust cover 16. The engaging projection 36 is situated front beyond the supporting shaft 9 so that when the dust cover 16 is in the closed position, under such state that the lock member is exerted frontward, said engaging member 31 of the front arm 29 can be engaged with the engaging projection 36 from below.

By this arrangement, when the video tape cartridge is not in use, the engaging member 31 of the lock member 23 engages with the engaging projection 36 from below as described above (see FIG. 7), the dust cover 16 is prevented from rotation about the connecting shafts 17 in the direction A, thereby locking the dust cover 17 in the closed position preventing movement thereof. Under such state, the front lid 6 is not directly locked. However, since the front edge portion of the top plate 16b of the dust cover 16 is overlapped on above the upper surface of the top front eaves 7a of the lid plate 7, the front lid 6 is also locked in the closed position.

When the video tape cartridge is mounted in the video tape recorder, as shown in FIG. 8, the lock releasing member 37 of the video tape recorder enters in the space 22 through the cut portion 21 of the lid plate 7 guided from front, pressing the pressing member 32 of the rear arm 30 of the lock member 23 backward, whereby the lock member 23 can be rotated frontward against the force of the lock spring 35 about the supporting shaft 28, resulting in disengagement of the engaging member 31 from the engaging projection 36 of the dust cover 16, therefore the dust cover can be released from the locked state to allow opening. On the other hand, the front lid 6 can be moved upward by the member abutting onto the lower edge of the front lid plate 7 of the front lid 6 against the force of the spring 13 to open the front lid 6.

Example 2

Figure 10:
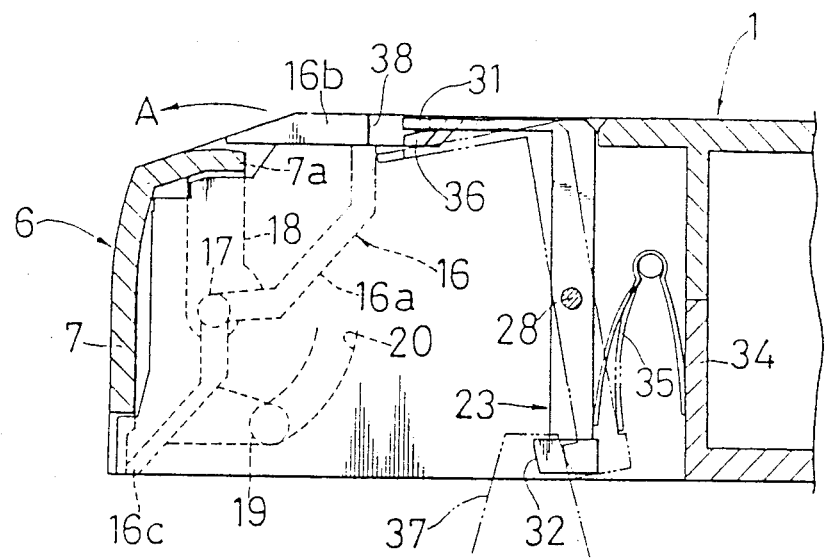
FIG. 10 is a cross sectional view showing an essential portion of example 2.
Figure 11:
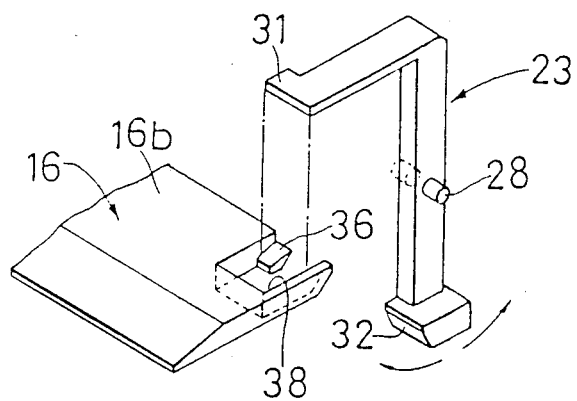
FIG. 11 is a partial exploded perspective view of the dust cover used in the example 2.

FIGS. 10 and 11 show a modification of the dust cover locking arrangement shown in the example 1, wherein the lock member 23 disposed in the space 22 is formed by a generally reversed L character shaped plate member having the engaging member 31 at the end of the horizontal arm and the pressing member at the lower end of the vertical arm. The lock member 23 is rotatably suspended by the supporting shafts 28 and is exerted by the lock spring 35 so that when the dust cover 16 is in the closed position, the engaging member 31 can engage with the upper surface of the engage projection 36 projectingly formed in the cut portion 38 defined in the rear edge portion of the top plate 16b of the dust cover 16 for preventing rotation of the dust cover 16 in the direction A. When the video tape cartridge is mounted on the video tape recorder, the pressing member 32 is pressed backward by the lock release member 37 of the video tape recorder, the lock member 23 can be rotated as shown in chain lines in FIG. 10, the engaging member 31 is moved below the engaging projection 36, being disengaged from the lock state, allowing opening the dust cover 16.

Example 3

Figure 12:
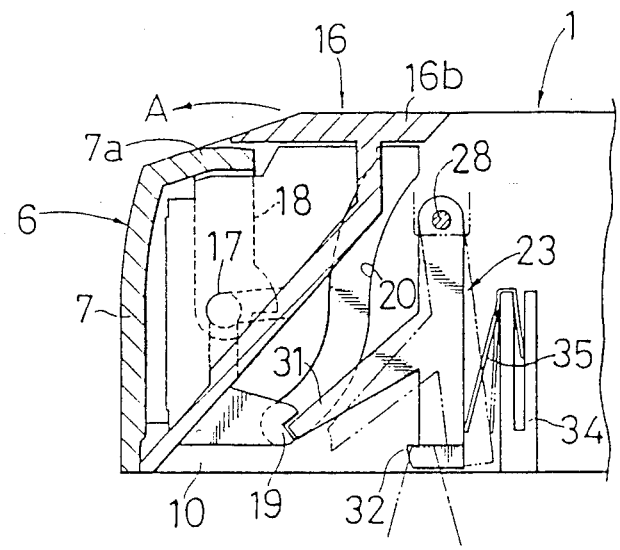
FIG. 12 is a cross sectional view showing an essential portion of example 3.
Figure 13:
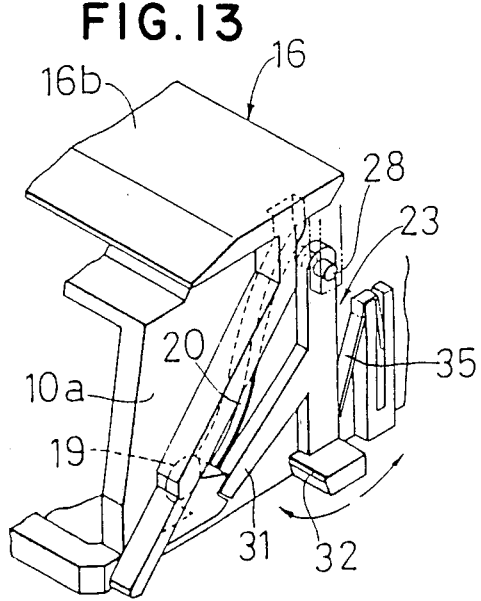
FIG. 13 is a perspective view showing an essential portion of FIG. 12.

Referring to FIGS. 12 and 13, the guide slot 20 is formed on the side wall 10 of the case body 1 and the guide pin 19 of the dust cover 16 is adapted to be slidably engaged in the guide slot 20. The lock member 23 having a reversed Y character shape is rotatably suspended about the supporting shafts 28 in the space 22 being exerted frontward by the spring 35 with the engaging member 31 engaged with the guide shaft 19 pushing from backward so as to prevent rotation of the dust cover 16 in the direction A. The other arrangements are similar to those in the first example. In this example, when the video tape cartridge is mounted on the video tape recorder, the lock member 23 can be rotated backward against the force of the lock spring 35, thereby releasing lock state.

Example 4

Figure 14:
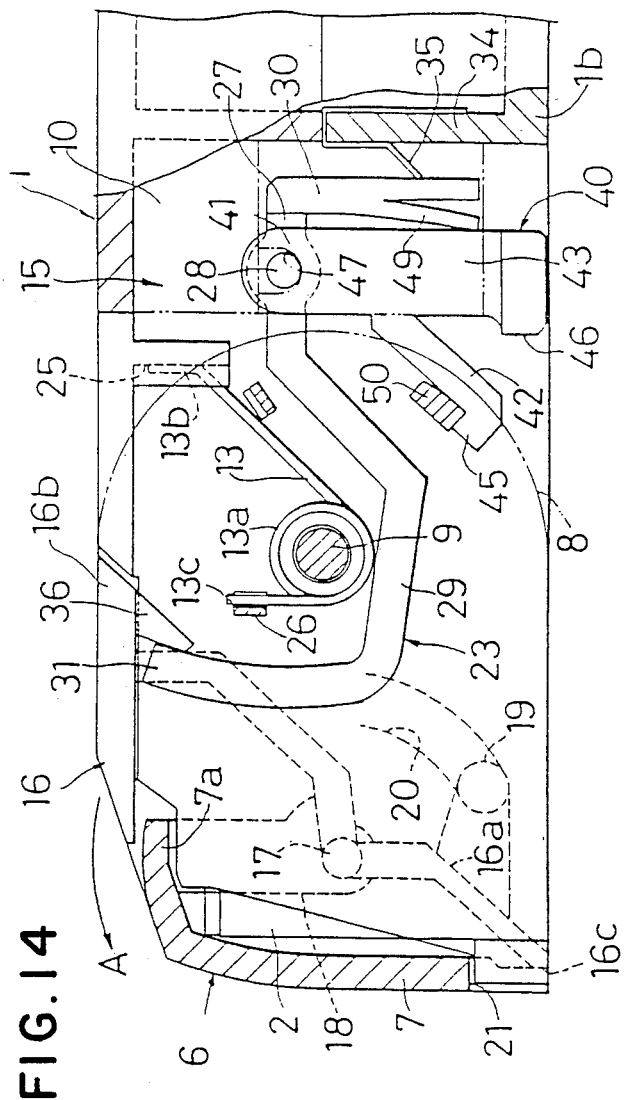
FIG. 14 is a cross sectional view showing an essential portion of example 4 with the dust cover and the front lid close.
Figure 15:
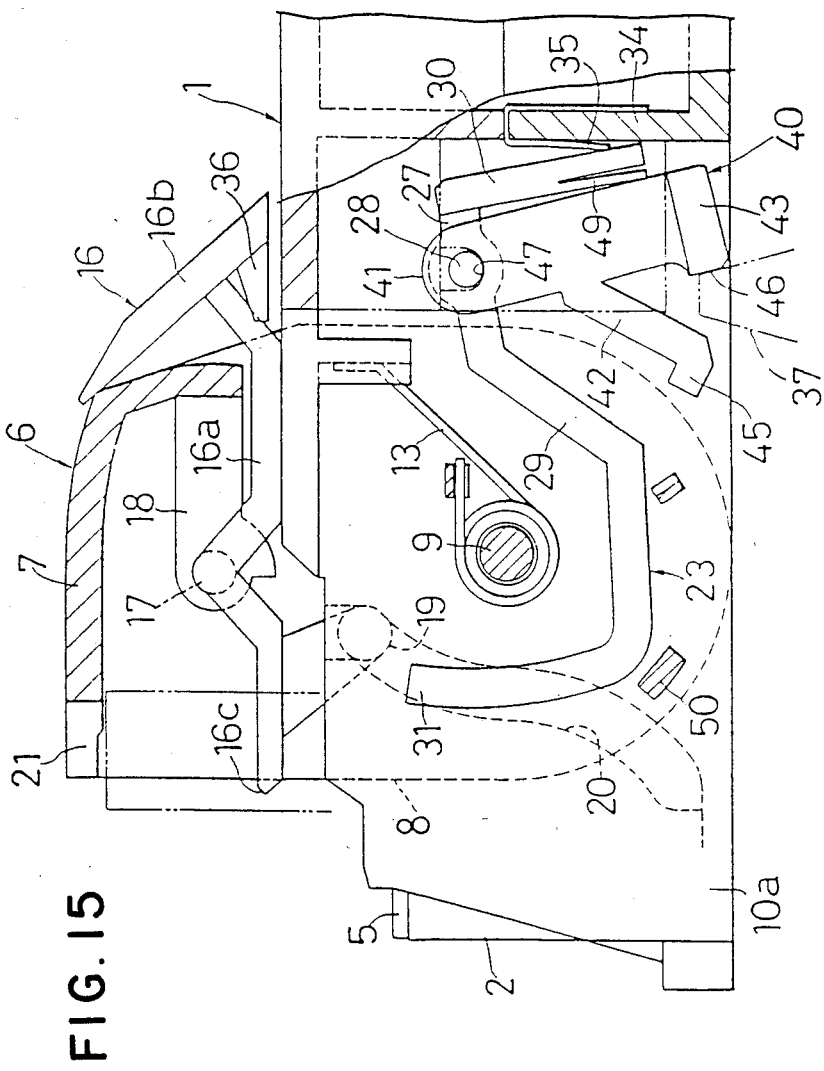
FIG. 15 is a cross sectional view showing an essential portion of example 4 with the dust cover and the front lid opened.
Figure 16:
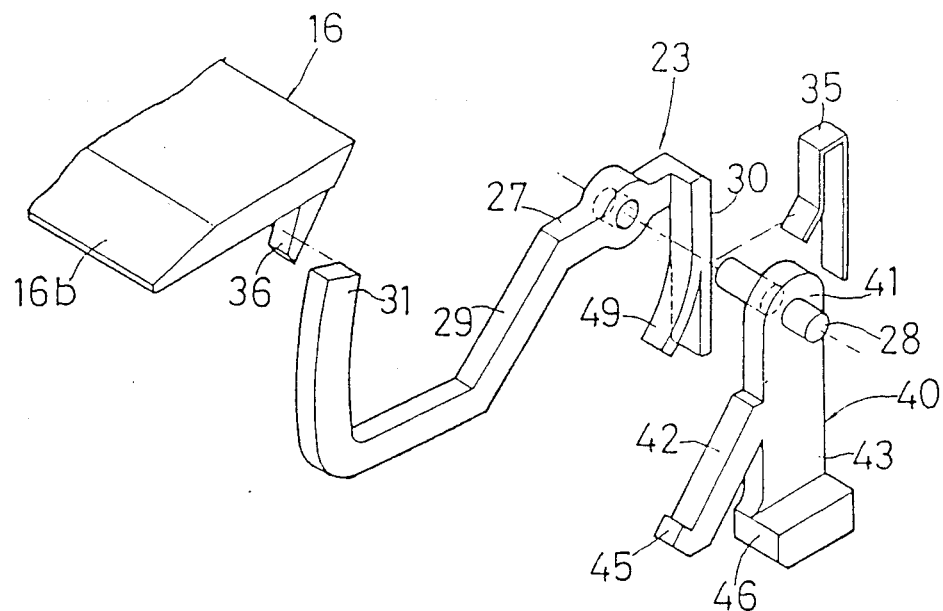
FIG. 16 is a perspective view of example 4.

Referring to FIGS. 14 through 16, wherein the lock member 40 of the front lid 6 is almost similar to that of the conventional lock member and is provided with supporting shafts 28 on the both sides of the base portion 41 with the front arm 42 and the rear arm 43 extending downward. The lock member is made of plastic resin material. An engaging hook 45 is formed on the front end portion of the front arm 42 and a pressing member 46 is formed on the lower end of the rear arm 43. The lock member 40 is adapted to be suspended movably in both frontward and backward by means of the supporting shafts 28 placed on the bearing recesses 47.

The lock member of the dust cover 16 having a shape as substantially same as in the example 1 is movably suspended with the base portion 27 supported using the supporting shafts 28. The lock member 23 has a spring member 49 formed integrally with the rear arm 30 with a predetermined resiliency. The front face of the spring member 49 resiliently pushes the rear arm 43 of the lock member 40 frontward. On the other hand, on the inner surface of the right side connecting member 8, there is projected an engaging member 50, which is situated backward to the supporting shaft 9. By this arrangement, when the lock member 40 is exerted frontward, the front engaging member of the front arm 42 can be engaged from below with the engaging member 50 of the front lid 6 which is in the closed position. Furthermore, the lock member 23 is exerted to rotate about the supporting shaft 23 by the force of the lock spring 35 supported on the spring receiving wall 34 formed on the bottom section 1b, whereby the lock member 23 can engage with the engaging projection 36 of the dust cover 16 which is in the closed position.

In this example 4, since the lock member 40 is provided separatedly for locking the front lid in the closed position, the front lid 6 and the dust cover can surely maintained in the closed position when not in use. It is not essential to overlap the front end portion of the top plate 16b of the dust cover 16 with the eaves 7a of the top plate 7 of the front lid 6.

The force of the spring 49 is weaker than the force of the lock spring 35. As the result, when the video tape cartridge is mounted on the video tape recorder, the opening movement of the dust cover 16 is somewhat delayed than the movement of the front lid 6, therefore, the gap g between the dust cover and the front lid is effectively eliminated even if the front lid 6 is shaked due to a clearance of the supporting portion of the front lid 6, since the dust cover is still kept in the locked state.

However, the front lid and the dust cover may be moved simultaneously.

Example 5

Figure 17:
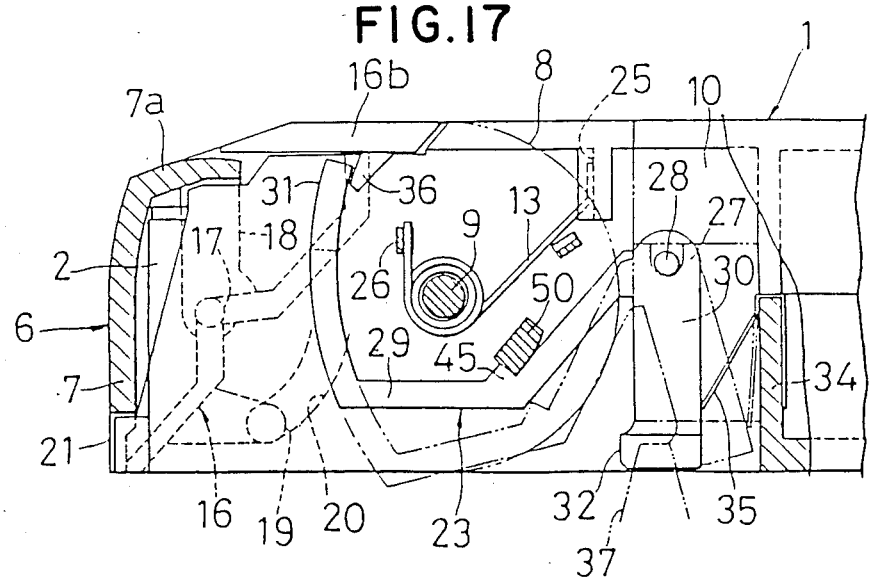
FIG. 17 is a cross sectional view showing an essential portion of example 5.
Figure 18:
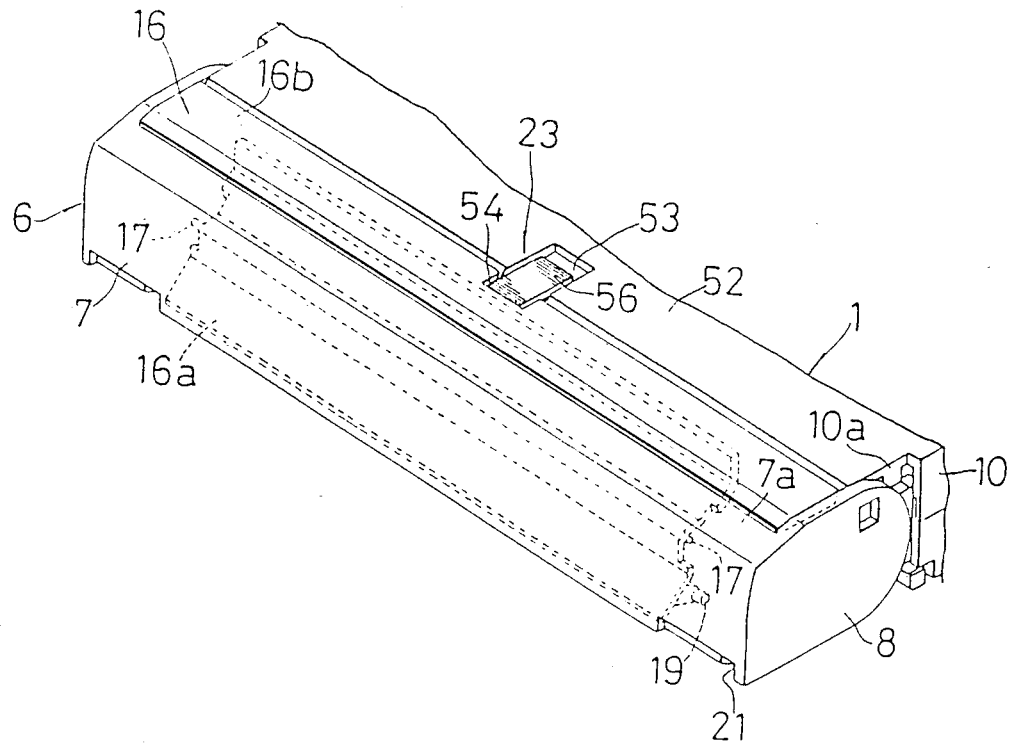
FIG. 18 is a perspective view showing an essential portion of example 6 of the recording tape cartridge.
Figure 19:
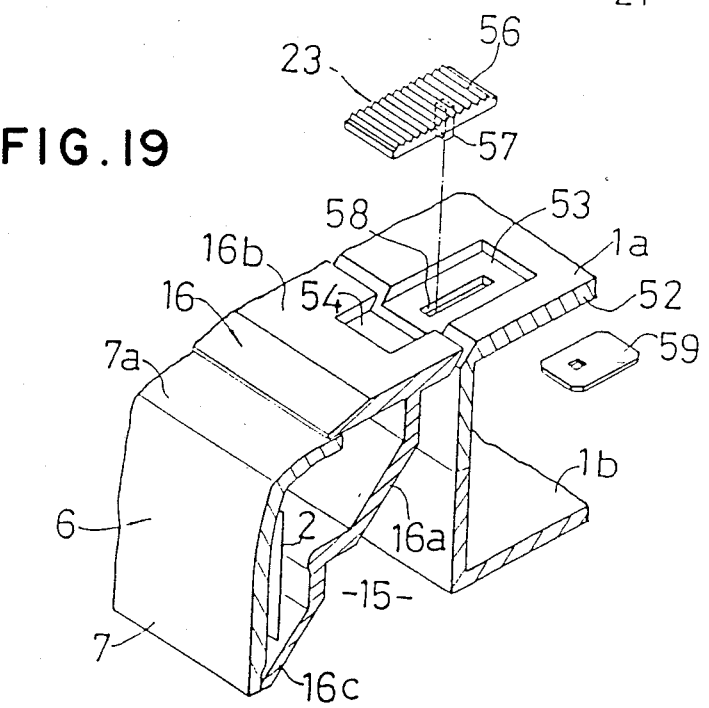
FIG. 19 is a partial exploded perspective view of FIG. 18.
Figure 20:
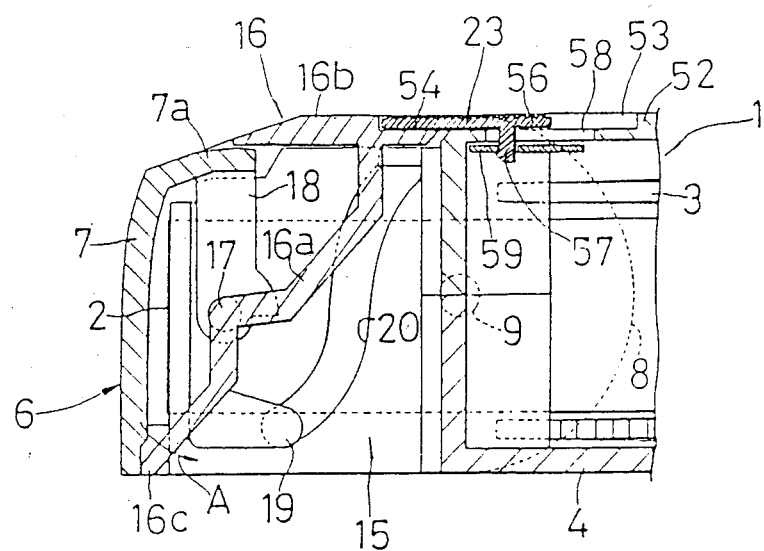
FIG. 20 is a cross sectional view of an essential portion of FIG. 18 with the front lid and the dust cover closed.

Referring to FIG. 17, the lock member 23 acts to lock both of the front lid 6 and dust cover 16 in the closed position. Other construction is similar to the construction shown in the examples 1 and 4. More specifically, the lock member 23 having a similar configuration shown in the example 1 has its base part 27 rotatably suspended on the side wall 10 by a supporting shaft 28 formed integral with the lock member 23. Said supporting shaft 28 may be formed by a separate member. The lock member 23 is provided with a hook member 45 at the intermediate part of the front arm 29 for engagement of the engaging member 50 formed on the front lid 6.

By this arrangement, the front lid 6 can be locked in the closed position by the engagement of the engaging member 50 and the hook member 45, on the other hand, the dust cover 16 can be locked in the closed position by the engagement of the engaging projection with the frontmost end 31 of the front arm 29 of the lock member 23.

Upon mounting of the video tape cartridge on the video tape recorder, the lock member 23 is rotated backward as shown in chain lines in FIG. 17, by the lock releasing member 37, the hook member 45 is disengaged from the engaging member 50, also the frontmost end 31 is disengaged from the engaging projection 36, whereby the front lid 6 and the dust cover can be released from the locked stated.

Various Modification of the Examples 1 to 5

In the above mentioned examples, the top plate 16b of the dust cover 16 is so formed as to extend over the entire length from the leftmost end and the rightmost end of the case body 1. However, the top plate 16b may have such length as substantially equal to the lateral width W of the pocket 15. In this case, the lock member 23 for the dust cover 15 may be disposed at a position opposing to the pocket 15.

In any case, the lock member 23 may be so arranged as to move linearly between the locking position and the lock released postion.

The term of the lock means for the dust cover 16 may include such a case that the lock member always resiliently contact the engaging projection 36 by a resilient member toward the closing position of the dust cover 16.

It is not essential in the present invention to provide the lock spring 35 for the lock member 23 but the lock member 23 can be so arranged as to be kept in either the lock position and the lock releasing position and to be switched from one position to other position manually or by an operation of a suitable member provided in the video tape recorder. In a case where the lock spring 35 is provided, the lock spring 35 may be formed by a resilient plate like member projected from and formed integral with the lock member 35.

In the example 4 in which the lock member 40 is formed independently of the lock member 23 of the dust cover 16, the lock member 23 and the lock member 40 may be situated in the different positions. In such case, in place of the arrangement in which the dust cover 16 is moved to the opened position co-operating with the movement of the front lid 6, the front lid 6 and the dust cover 16 may be so arranged as to be moved independently.

Example 6

FIGS. 18 through 21 shows the sixth example of the embodiment of the present invention, wherein the lock member 23 is provided across the case body 1 and the dust cover 16.

Referring to FIGS. 18 through 21, a guide recess 53 having a rectangular shape with an opening on front side is defined on the front edge portion of the top plate 52 of the top section 1a, preferably on the central part of the front portion of the top section 1a, while an engaging recess 54 is defined on the top face of the top plate 16b of the dust cover 16 with the rear portion thereof opened so as to opposed the guide recess 53. The lock member 23 is situated in the guide recess 53. The lock member 23 is made of a plastic resin material, having a flat plate like operating member 56 with a connecting chip 57 projected downwardly from the bottom face of the operating member 56. Said operating member 56 is movably mounted in the guide recess 53 with the connecting chip 57 passed through an elongated opening 58 defined on the bottom wall of the guide recess 53 directed longitudinal direction of the case body 1. A plate member 59 is fitted to the bottom end of the connecting chip 57 for preventing disengagement of the operating member 56 from the guide recess 53 in an upward direction. Said operating member 56 is slidable in the longitudinal direction along the elongated opening 58.

Figure 21:
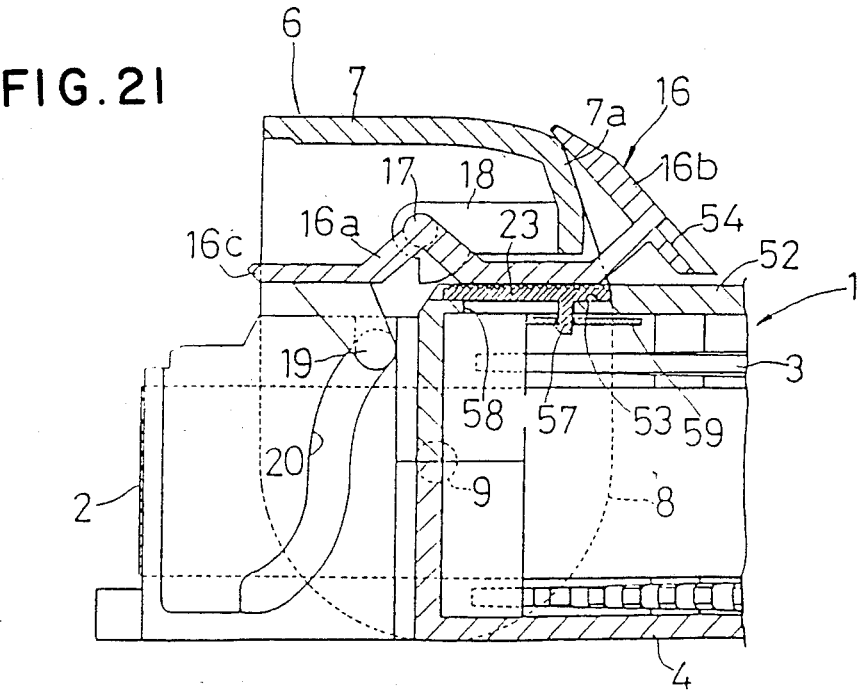
FIG. 21 is a cross sectional view showing an essential portion of FIG. 18 with the front lid and the dust cover opened.

When the video tape cartridge is not used, the operating member 56 acting as the lock member 23 is manually shifted frontward so that the operating member 56 fitted in the engaging recess 54 defined on the top face of the top plate 16b of the dust cover 16 which is in the closed position. Whereby the dust cover is prevented from rotation in the direction A by the engagement of the operating member 56 with the top plate 16b from above. Also, undesired displacement of the dust cover can be prevented. In a case where the front lid is so arranged as to be co-operated with the dust cover, the front lid 6 also can be locked in the closed position. When the video tape cartridge is mounted on the video tape recorder, as shown in FIG. 21, the operating member 56 is manually displaced backward along the recess 58 so that the front end portion of the operating member is disengaged from the engaging recess 54 of the top plate 16b of the dust cover 16, thereby releasing the lock of the dust cover 16.

Example 7

Figure 22:
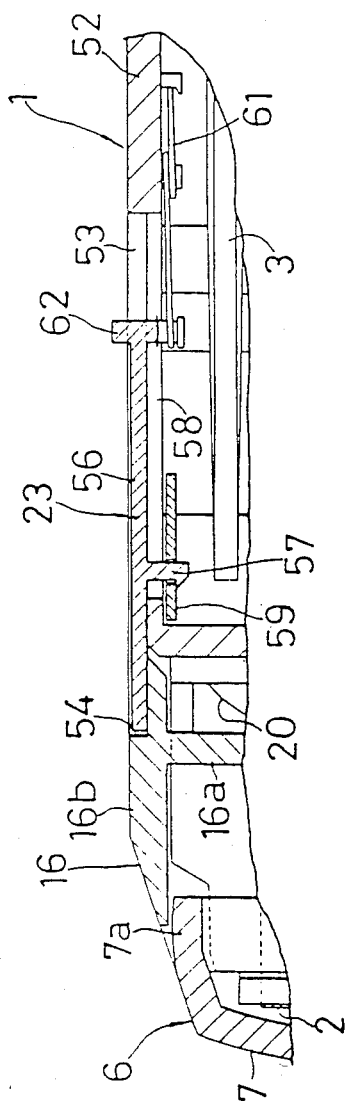
FIG. 22 is a cross sectional view of an essential portion of example 7 with the front lid and the dust cover closed.
Figure 23:
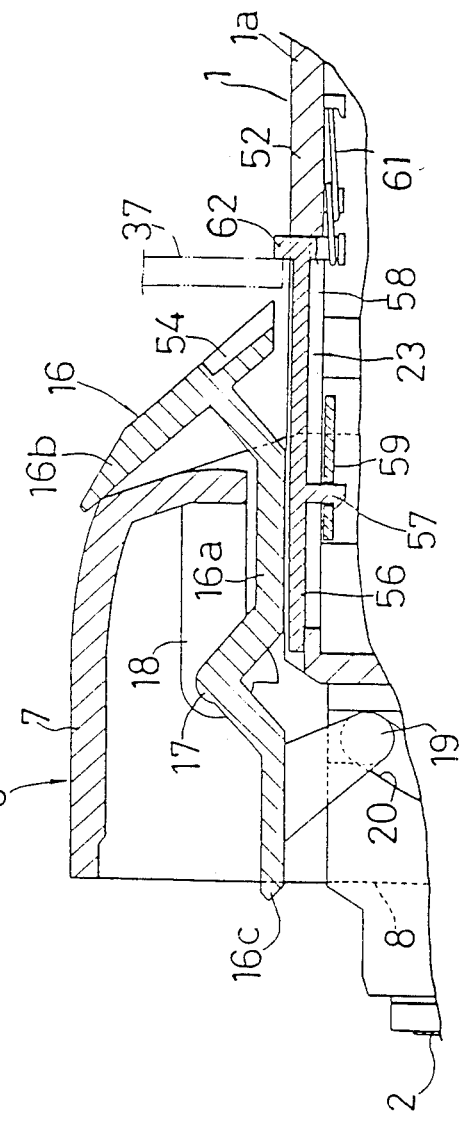
FIG. 23 is a cross sectional view of an essential portion of example 7 with the front lid and the dust cover opened.

FIGS. 22 and 23 show the seventh example of the present invention, wherein in place of manually moving the operating member 56 in the example 6, the operating member 56 is adapted to be operated by the lock releasing member in the video tape recorder.

Referring to FIGS. 22 and 23, a torsion spring 61 is disposed below the lower surface of the top plate 52 of the top section 1a so that the torsion spring 61 exerts the lock member 23 frontward to the lock position, thereby the lock member 23 is engaged with the engaging recess 54 of the dust cover 16 when the video tape cartridge is not in use. When the video tape cartridge is mounted on the video tape recorder, the lock releasing member in the video tape recorder engages with an abutting member 62 formed on the top face of the operating member 56 of the lock member 23 so that the lock member 23 is moved in the guide recess 53 for releasing the lock state of the dust cover 16.

In the example 7, since the lock member 23 is normally located in the lock position so as to lock the dust cover 16 in the lock state so far as the dust cover is in the closed position or in the unused postion. Accordingly, so far as the front lid and the dust cover are cooperated as in this example, it is sufficient to lock the dust cover and the front lid by locking only the dust cover. However, if the dust cover and the front lid can be operated independently, it is desired to provide the arrangement for locking the front lid 6 in addition to the locking member for the dust cover.

Example 8

Figure 24:
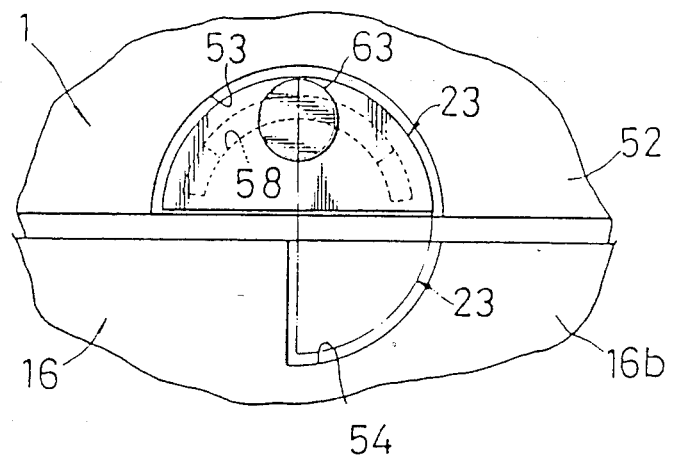
FIG. 24 is a partial plan view showing an essential portion of example 8.
Figure 25:
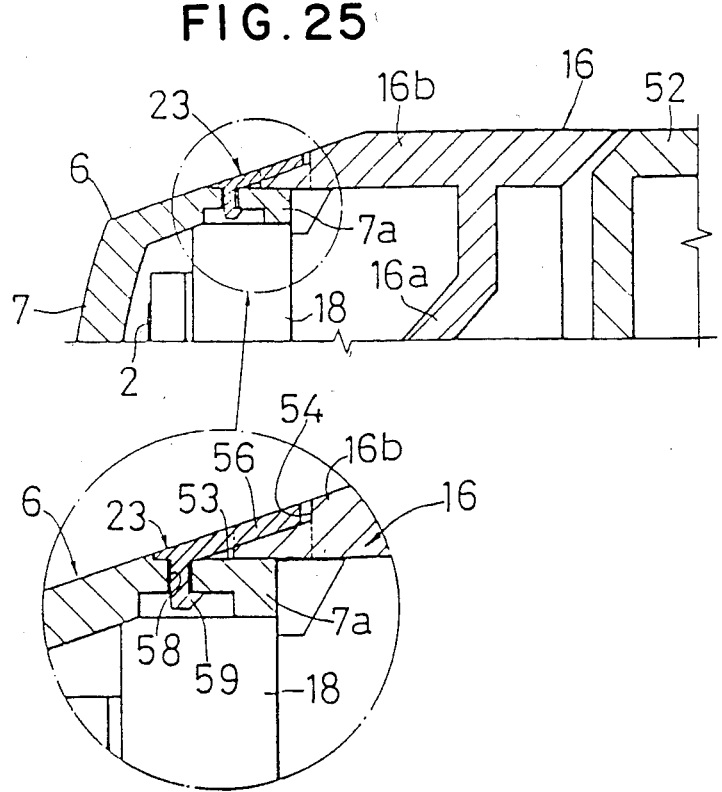
FIG. 25 is a partial cross sectional view showing an essential portion of example 9.

Referring to FIG. 24, there is defined a semi-circular guide recess 53 on the top wall 52 of the top section 1a for accommodating the lock member 23. While another guide recess 54 is defined on the top face of the top plate 16b of the dust cover in the form of a quarter of a circle having its center coincided with the center of the guide recess 53 with the level of the bottom of the guide recess 53 to be flush with the bottom of the another guide recess 54. The lock member 23 is a semi circular plate rotatably accommodated in the guide recess 53 and 54 with an operating knob 63 slidably fitted in an elongated slot 53 in an arcuated configuration in plan view defined on the bottom of the guide recess 53 for preventing disengagement of the lock member 23. When in no use, the lock member 23 is manually rotated in the clockwise direction so as to engage the lock member 23 with the top face of the guide recess 54, on the other hand, when in use, the lock member 23 is manually rotated in the counter clock wise direction, the lock member 23 is fully retracted on the guide recess 53 for releasing the locking state of the dust cover.

Example 9

Referring to FIGS. 25 through 28, guide recess 53 and 54 are formed across the top eaves 7a of the lid plate of the front lid 6 and the top plate 16b of the dust cover 16. In the guide recess 53, there is defined an elongated slot 58 extending laterally for accommodating a holding member 59 in the guide recess 53 of the front lid side, while on the engaging recess 54 of the dust cover 16, there are formed a cut portion 64 in the form of a through hole and an engaging chip 65 to which the operating member 56 of the lock member 23 engages.

Figure 1:
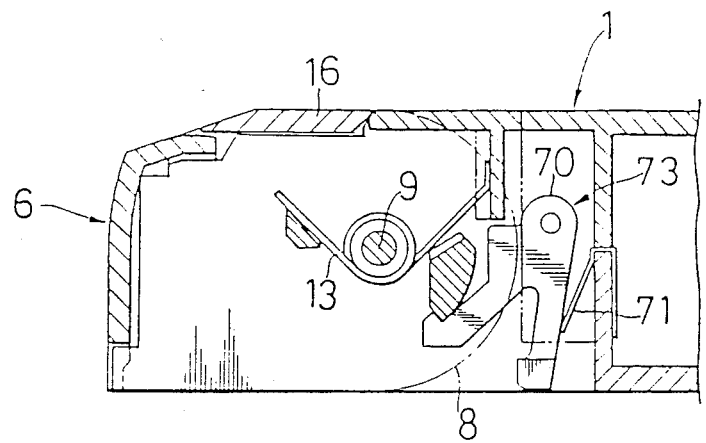
FIG. 1 is a cross sectional view showing one example of a conventional recording tape cartridge.
Figure 2:
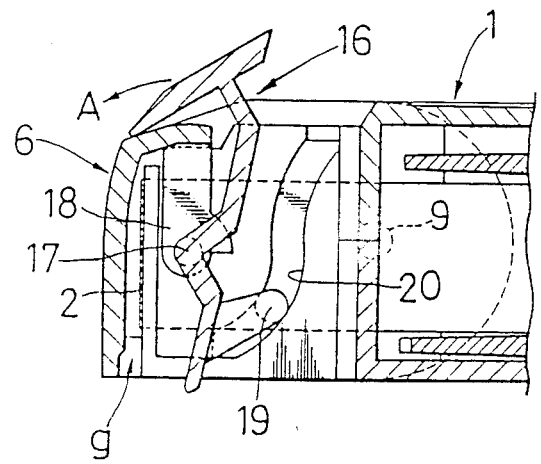
FIG. 2 is a cross sectional view of an essential portion of the conventional recording tape cartridge showing an undesired gap occurring between the dust cover and the front lid.
Figure 26:
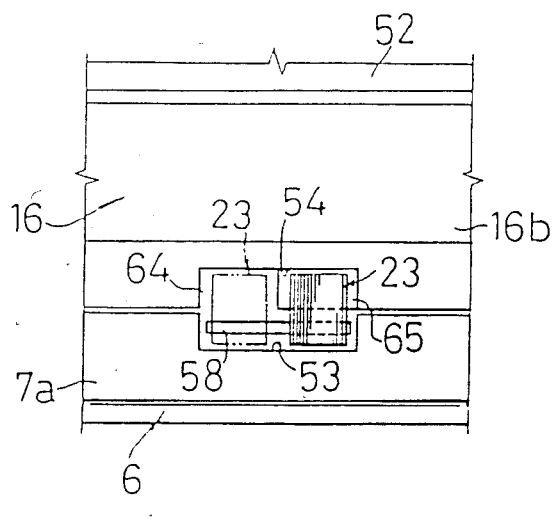
FIG. 26 is a partial plan view of example 9.
Figure 27:
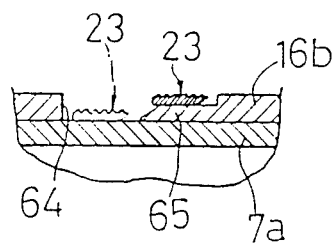
FIG. 27 is a cross sectional view of example 9.
Figure 28:
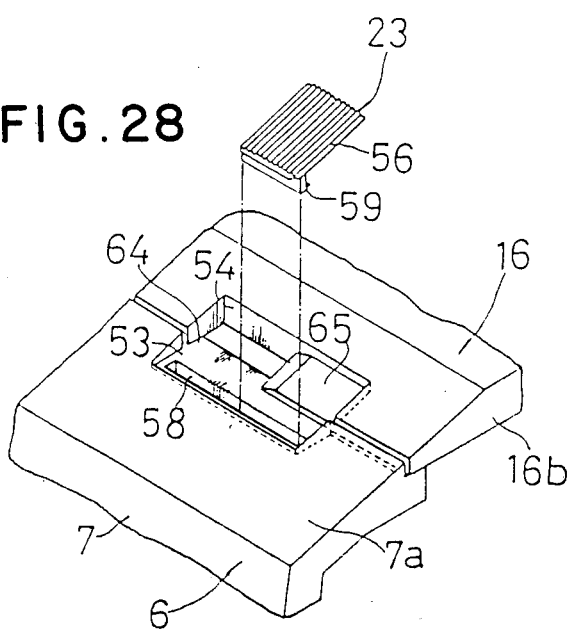
FIG. 28 is a partial exploded perspective view of example 9.
Figure 29:
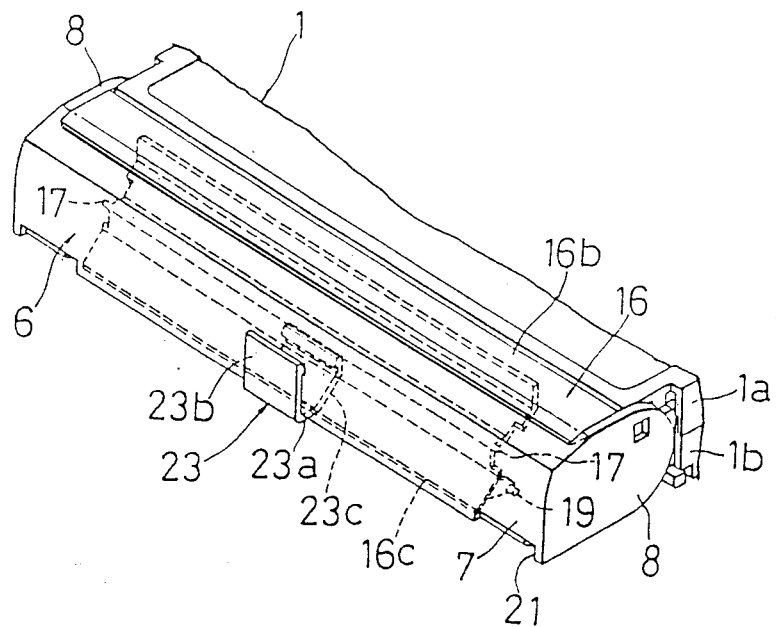
FIG. 29 is a partial perspective view showing an essential portion of example 10.
Figure 30:
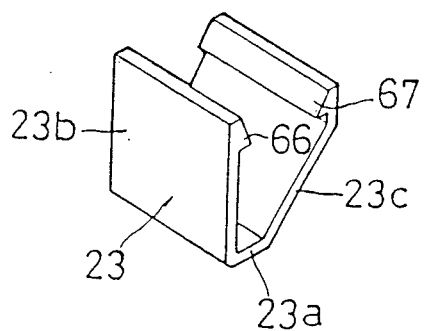
FIG. 30 is a perspective view showing a lock member used in example 10.
Figure 31:
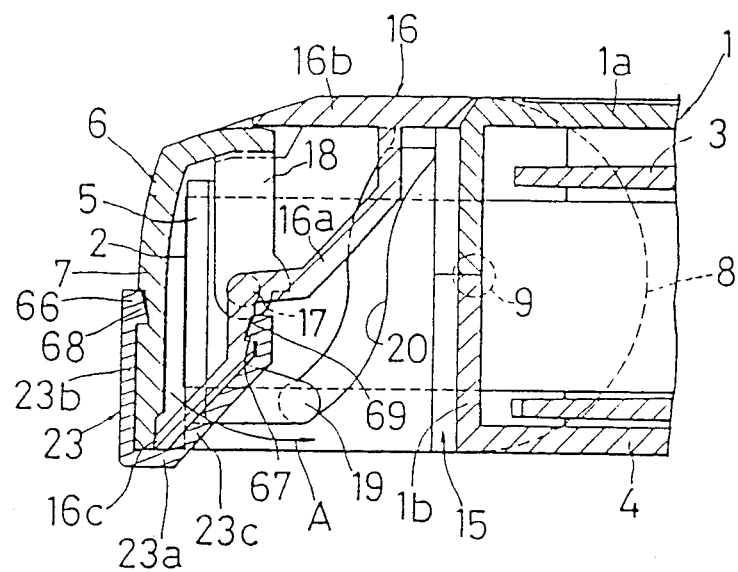
FIG. 31 is a cross sectional view showing an essential portion of example 10 with the dust cover closed and the lock member shown in FIG. 30 mounted.
Figure 32:
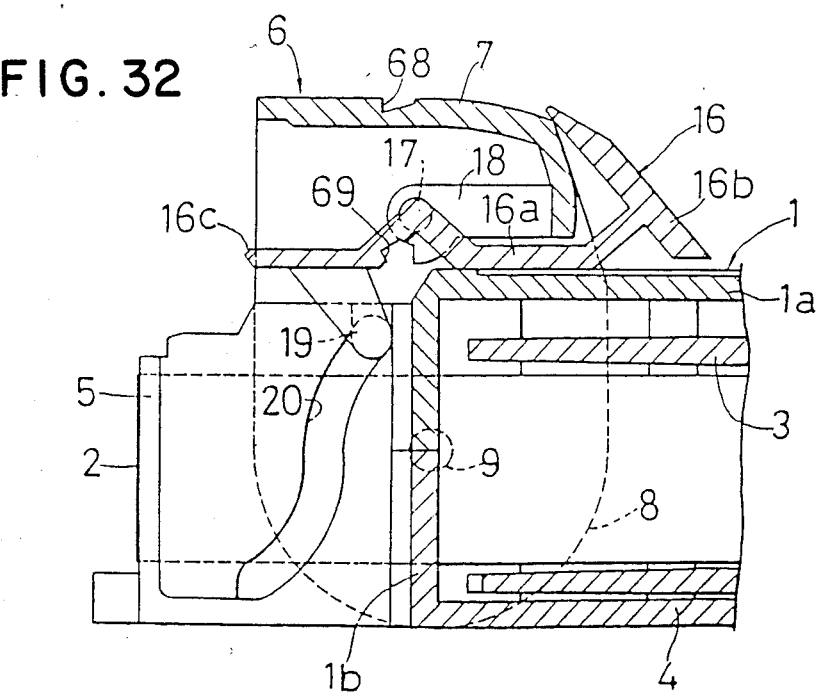
FIG. 32 is a cross sectional view showing an essential portion of example 10 with the front lid and the dust cover opened.

By this arrangement, when in no use of the video tape cartridge, as shown in FIGS. 26 and 27 by the real lines, the lock member 23 is manually slided so as to engage the lock member 23 on the top face of the engaging member 65, the dust cover 16 can be engaged with the engaging member 65, the connecting shaft 17 and a bottom engaging portion 16c of the dust cover 16, thereby the dust cover 16 is supported on the front lid 6 by three points. Therefore the dust cover 16 is locked in the closed position simultaneously with the front lid 6. In order to release the locking state, the lock member 23 is manually slided leftward as shown by the chain line in FIGS. 26 and 27, so as to place the lock member 23 on the cut portion 64. Then the dust cover 16 and the front lid 6 can be rotated freely to release the locking state. In this example, there is no need to provide a lock means 73 as shown in FIG. 1, however if the mechanical strength of the corresponding part is weak, there may be provided a separate lock means for the front lid 6. In this case, only the dust cover 16 can be switched between the locked state and the released upon operation of the lock member 23.

Various Modification of the Examples 6 to 9

Said lock member 23 is generally uncovered, the present invention is not limited to the construction as above, but it is possible to expose a part of the lock member for manual operation by operating the exposed part. For example, in the examples of 6 through 8, the rear part of the lock member 23 may be covered by the tape wall of the case body 1 with the front portion thereof exposed or uncovered for engagement or vice verse. In the example 9, the front port of the lock member 23 is exposed from the front lid 6 with the rear part thereof is engaged with the part of the inside face of the top plate 16b or vice versa.

The way of mounting of the lock member 23 shown in examples 6 to 8 can be applied to that of example 9 wherein the lock member 23 is mounted in the space between the front lid and the dust cover 16. In any examples of 6 to 9, the lock member 23 may be fitted to the tape plate 16b of the dust cover 16 if necessary.

Example 10

Referring to FIGS. 29 through 32, the lock member 23 is made of a resilient material of plastic resin, with the shape of a reversed V character in cross sectional view in which engaging plate 23b and 23c are projected upward on both front side and rear side of the connecting plate 23a. A pair of engaging members 66 and 67 are formed inwardly opposing one another at the top portion of the engaging plates 23b and 23c. An engaging recess 68 is defined on the outer face of the front lid 6 is formed corresponding to the lock member 23 and an engaging recess 69 is defined on the rear face of the dust cover 16.

By this arrangement, the lock member 23 is fitted on the dust cover 16 and the front lid 6 both in the closed position from below, at the position corresponding to the pocket 15, thereby causing the engaging plates 23b and 23c to be resiliently expanded and in turn causing the engaging members 66 and 67 of the engaging plates 23b and 23c to be engaged in the engaging recesses 68 and 69 respectively preventing disengagement of the former 66 and 67 from the latter 68 and 69, whereby the front lid 6 and the dust cover 16 can be clamped by the lock member 23 so as to lock the in the closed position. Thus, the lower portion 16c of the dust cover 16 is prevented from rotation in the direction A with the engagement of the lower portion 16c to the inner face of the lower portion of the front lid 6 to prevent occurrence of the gap g as mentioned above. In this example, it is desired to lock the front lid 6 in the closed position by lock means 73 as shown in FIG. 1. However provision of the lock means 73 is not essential and such lock means 73 may be omitted since the dust cover 16 is connected integral with the front lid 6 by the lock member 23 and connected to the case body 1, opening movement of the front lid 6 also can be prevented. When using the video tape cartridge the lock member 23 is forcibly manually removed from the dust cover 16 and the front lid 6.

Example 11

Figure 33:
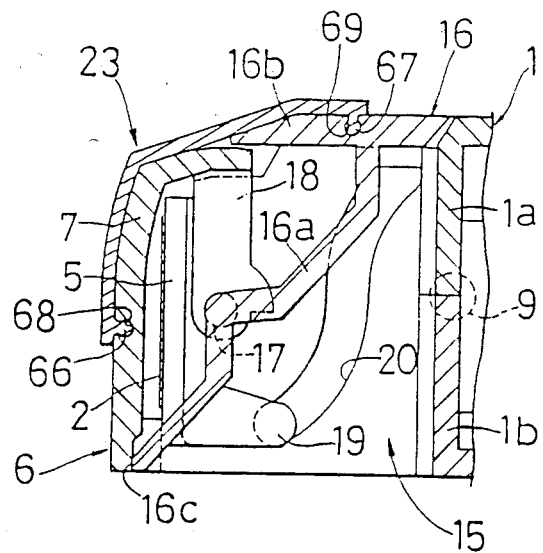
FIG. 33 is a cross sectional view showing an essential portion of example 11.

Referring to FIG. 33. the lock member 23 is so arranged that the lock member 23 can be snappingly secured on the front lid 6 and the dust cover 16 across the front face of the upper portion of the front lid 6 and the front portion of the top face of the dust cover 16 from front.

Example 12

Figure 34:
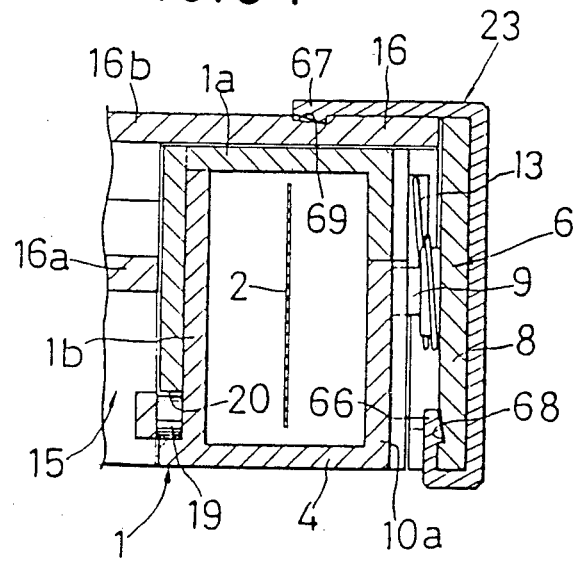
FIG. 34 is a cross sectional view showing an essential portion of example 12.

Referring to FIG. 34, the lock member 23 is formed by a generally rectangularly bent plate with a suitable resiliency. A hook 66 formed on the bottom bent portion of the lock member 23 is adapted to be engaged with the recess 68 defined in the inner face of the front lid 6 and another hook 67 formed on the top plate of the lock member 23 is adapted to be engaged in the recess 69 of the top face of the top plate 16b. By this arrangement, the lock member 23 can be fitted onto the side end portion of the front lid 6 and the dust cover 16 from one of the lateral side of the case body 1, thereby connecting the front lid 6 and the dust cover 16 for locking them respectively in the closed position. When using the video tape cartridge, the lock member is manually removed from the video tape cartridge.

Although the foregoing description is made with reference to the video tape cartridge, the present invention can be applied to various recording tape cartridges.

What is claimed is:

1. A magnetic recording tape cartridge comprising a case body, a recording tape accommodated in the case body, front lid means movably mounted on the case body, being operable to be opened and closed for covering the front surface of the recording tape drawn out of the case body upon closure of the front lid means, dust cover means movably mounted on the case body, being operable to be opened and closed for covering the rear surface of the recording tape drawn out of the case body upon closure of the dust cover means and lock means for keeping the dust cover means in the closed state.

2. The recording tape cartridge according to claim 1, wherein said lock means is mounted on the case body so as to detachably engage with the part of the dust cover means situated in the closed state.

3. The recording tape cartridge according to claim 1, wherein said lock means is detachably mounted across the case body and the dust cover means situated in the closed state.

4. The recording tape cartridge according to claim 1, wherein said lock means is detachably mounted across the front lid means and the dust cover means both situated in the closed state.

5. The recording tape cartridge according to claim 1, wherein said front lid means and the dust cover means are connected together so as to co-operate each other when they are opened or closed.

6. The recording tape cartridge according to claim 1, wherein said front lid means comprises front lid plate (7) covering over the front part of the case body from the left end to the right end of the case body, connecting arms (8) projected backward from either the left end and the right end of the front lid plate (7), supporting shafts (9) projected from the inner face of the connecting arms so as to oppose each other, said connecting arms (8) are adapted to engage with the outer front parts of the left side wall and the right side wall (10) of the case body and the front lid means is rotatably supported on the outer front parts of the case body by the supporting shafts.

7. The recording tape cartridge according to claim 1, wherein said front lid means is normally exerted towards the closed state.

8. The recording tape cartridge according to claim 1, wherein said dust cover means (16) comprises a cover plate (16a) existing corresponding to the lateral width of a front opening of a pocket (15) defined in the bottom part of the case body (1), said cover plate (16a) being located backward of the lid plate (7) of the front lid means (6) in the closed state interposing the recording tape (2), a top plate (16b) connected with the top portion of the cover plate (16a) so as to close at least the upper portion of the pocket (15) and a lower engaging member (16c) formed on the lower part of the cover plate (16a) at a position opposing to the pocket (15) and adapted to be engaged with the lower portion of the lid plate (7).

9. The recording tape cartridge according to claim 1, wherein connecting members (17) provided on the left and right ends of the cover plate (16a) of the dust cover (16) are rotatably supported by bearing means (18) of the lid plate (7) and guide pins (19) are projected from the dust cover means so as to be movably engaged in corresponding guide slots (20) defined on wall members defining left end and the right end of the pocket (15).

10. The recording tape cartridge according to claim 8, wherein said top plate (16b) of the dust cover means (16) has a front edge portion overlapped above the top surface of a top eaves (7a) of the lid plate (7) of the front lid means (6).

11. The recording tape cartridge according to claim 8, wherein a space (22) is defined between the one of the side walls (10) of the case body (1) and one of the connecting arms (8) of the front lid means (6) opposing to said one of the side walls and the top plate (16b) of the dust cover means (16) extends over the upper part of the space (22).

12. The recording tape cartridge according to claim 11, wherein the locking means (23) is mounted on one of the side walls (10) facing to the space (22) so as to be moved between a locking position where the locking means (23) can engage with top plate (16b) of the dust cover (16) and a releasing position where the locking means (23) is disengaged from the top plate (16b).

13. The recording tape cartridge according to claim 8, wherein said locking means (23) is mounted on a position facing to the pocket (15).

14. The recording tape cartridge according to claim 8, wherein said locking means (23) can be mounted across the top wall (52) of the case body (1) and the top plate (16b) of the dust cover means (16), the locking member being operable to be changed over between a locking position for preventing opening of the dust cover means (16) and the released position for allowing opening of the dust cover means (16).

15. The recording tape cartridge according to claim 14, wherein said locking means (23) is arranged so as to be manually operable between the locking state and the lock releasing state.

16. The recording tape cartridge according to claim 14, said locking means (23) is arranged so as to be operable between the locking state and the lock releasing state by a lock releasing member provided in a tape recording/reproducing apparatus.

17. The recording tape cartridge according to claim 8, said locking means (23) is mounted across the upper eaves (7a) of the lid plate 7 of the front lid means (6) and top plate (16b) of the dust cover (16) in the closed state so as to be operable to be changed over between the locking position for locking the dust cover (16) in the closed state and the lock releasing position for releasing the locking state of the dust cover.

18. The recording tape cartridge according to claim 8, wherein said locking means (23) is manually detachably engageable with the dust cover means (16) and the front lid means (6) both in the closed state.

* * * * *